United States Patent
Vegeberg

(10) Patent No.: US 12,203,550 B2
(45) Date of Patent: Jan. 21, 2025

(54) SOLID PLATE AND STUFFING BOX COMPRISING THE SOLID PLATE

(71) Applicant: HAARSLEV INDUSTRIES A/S, Søndersø (DK)

(72) Inventor: Kåre Beck Vegeberg, Odense SV (DK)

(73) Assignee: HAARSLEV INDUSTRIES A/S, Søndersø (DK)

( * ) Notice: Subject to any disclaimer, the term of this patent is extended or adjusted under 35 U.S.C. 154(b) by 71 days.

(21) Appl. No.: 17/910,809

(22) PCT Filed: Mar. 8, 2021

(86) PCT No.: PCT/EP2021/055729
§ 371 (c)(1),
(2) Date: Sep. 10, 2022

(87) PCT Pub. No.: WO2021/180622
PCT Pub. Date: Sep. 16, 2021

(65) Prior Publication Data
US 2023/0117912 A1   Apr. 20, 2023

(30) Foreign Application Priority Data

Mar. 12, 2020  (DK) ............................ PA 2020 00333
Nov. 20, 2020  (DK) ............................ PA 2020 01315

(51) Int. Cl.
   *F16J 15/18*   (2006.01)
(52) U.S. Cl.
   CPC ........... *F16J 15/181* (2013.01); *F16J 15/183* (2013.01); *F16J 15/184* (2013.01)

(58) Field of Classification Search
   CPC ......... F16J 15/184; F16J 15/183; F16J 15/181
   See application file for complete search history.

(56) References Cited

U.S. PATENT DOCUMENTS

| | | | |
|---|---|---|---|
| 1,925,898 A | | 9/1933 | Fritz |
| 2,009,423 A | * | 7/1935 | Wheeler ................ F16J 15/183 |
| | | | 277/516 |

(Continued)

FOREIGN PATENT DOCUMENTS

| | | |
|---|---|---|
| AU | 2015245635 A1 | 10/2016 |
| CN | 201149088 Y | 11/2008 |

(Continued)

OTHER PUBLICATIONS

Search Report dated Sep. 22, 2020 issued in corresponding Danish Application No. PA 2020 00333.

(Continued)

*Primary Examiner* — Eugene G Byrd
(74) *Attorney, Agent, or Firm* — Nath, Goldberg & Meyer; Joshua B. Goldberg; Jerald L. Meyer

(57) ABSTRACT

The present invention relates to a stuffing box assembly comprising a stuffing box and a solid plate, the solid plate may be placed at the shaft introducing end of the stuffing box, between the stuffing box and a surface, when the stuffing box assembly is mounted on to the surface, the solid plate may be on a first side provided with a pressure plate flange and on a second side be provided with a counter pressure plate flange, wherein the pressure plate flange and/or the counter pressure plate flange is provided with one or more locking projections pointing towards the solid plate.

13 Claims, 3 Drawing Sheets

(56) References Cited

U.S. PATENT DOCUMENTS

| | | | |
|---|---|---|---|
| 2,433,589 A | 12/1947 | Adams | |
| 3,638,956 A | 2/1972 | Dagwell | |
| 4,795,572 A * | 1/1989 | LaValley | F16L 25/00 |
| | | | 210/402 |
| 5,716,055 A | 2/1998 | Wilkinson et al. | |
| 7,048,254 B2 * | 5/2006 | Laurent | F16K 41/02 |
| | | | 277/518 |
| 2003/0173744 A1 * | 9/2003 | MacDonald | F16J 15/3276 |
| | | | 277/394 |
| 2004/0183258 A1 | 9/2004 | Kunz et al. | |
| 2008/0106045 A1 | 5/2008 | Lembcke | |
| 2009/0045589 A1 * | 2/2009 | Patton | F16J 15/183 |
| | | | 277/516 |
| 2014/0105527 A1 | 4/2014 | Thoma et al. | |
| 2014/0307990 A1 * | 10/2014 | Forrest | F16J 15/184 |
| | | | 384/130 |
| 2015/0226333 A1 | 8/2015 | Yanagisawa et al. | |
| 2021/0277956 A1 * | 9/2021 | Monahan | F16J 15/189 |

FOREIGN PATENT DOCUMENTS

| | | | |
|---|---|---|---|
| CN | 201269212 Y | 7/2009 | |
| CN | 104565380 A | 4/2015 | |
| CN | 105042078 A | 11/2015 | |
| CN | 205101559 U | 3/2016 | |
| CN | 205663648 U | 10/2016 | |
| CN | 109689302 A * | 4/2019 | F16D 51/24 |
| GB | 2 057 597 A | 4/1981 | |
| WO | 83/03654 A1 | 10/1983 | |
| WO | 2017123377 A1 | 7/2017 | |

OTHER PUBLICATIONS

International Search Report issued on Jun. 2, 2021, for application No. PCT/EP2021/055729.

International Preliminary Report on Patentability issued on Sep. 22, 2022, for application No. PCT/EP2021/055729.

* cited by examiner

SOLID PLATE AND STUFFING BOX COMPRISING THE SOLID PLATE

This is a National Phase Application filed under 35 U.S.C. 371 as a national stage of PCT/EP2021/055729, filed Mar. 8, 2021, an application claiming the benefit of Danish Application No. PA 2020 00333, filed Mar. 12, 2020 and Danish Application No. PA 2020 01315, filed Nov. 20, 2020, the content of each of which is hereby incorporated by reference in its entirety.

TECHNICAL FIELD OF THE INVENTION

The present invention relates to a solid plate for a stuffing box and a stuffing box as such. In particular the present invention relates to a solid plate for a stuffing box, a well as to the stuffing box as such, wherein the solid plate is provided for absorbing axial and/or radial movements of a shaft when the stuffing box is in use.

BACKGROUND OF THE INVENTION

A stuffing box is an assembly which is used to house a gland seal. Stuffing boxes are used to prevent leakage of fluid, such as water, fat or any other liquid, between sliding or turning parts of machine elements. Leakage often occurs along a moving rod or shaft at the point at which it leaves a cylinder, a tank, a ship hull, a machine or an apparatus.

Generally, a stuffing box comprises a packing gland housing which comprises a packing gland and a packing material. The packing gland and the packing material encircles a moving shaft and creates the seal preventing leakage of a fluid along the moving shaft. When assembled the packing gland is tightened and the packing material is compressed, creating the seal.

Creating a proper installation of the moving shaft and ensuring precise alignment is critical in order to ensure correct flow and a long wear life of the stuffing box and for preventing the stuffing box from leaking.

Misalignment during installation or distortions along the rotating axle, e.g. the shaft, may result in axial movements and/or radial movements of the shaft creating gaps in the packing material enclosing the shaft and the liquid will start to leak along the shaft.

Hence, an improved stuffing box would be advantageous, and in particular a more efficient and/or reliable stuffing box with long wear life and limited or no leakage, which is easily constructed, and easy and inexpensive to repair, would be advantageous.

SUMMARY OF THE INVENTION

Thus, an object of the present invention relates to a new stuffing box assembly.

In particular, it is an object of the present invention to provide a stuffing box assembly that solves the above mentioned problems of the prior art with leakage, requirements for precise alignment during installation; and absorption of axial and/or radial movements.

Thus, one aspect of the invention relates to a solid plate comprising a flexible material, the solid plate comprises a hole provided for receiving a rotating shaft and at least one cavity.

Another aspect of the present invention relates to a stuffing box assembly comprising a stuffing box and a solid plate according to the present invention, the solid plate is placed at the end of the stuffing box, between the stuffing box and a surface, when the stuffing box assembly is mounted on to the surface, the solid plate is on one side provided with a pressure plate flange and on the other side provided with a counter pressure plate flange, wherein the pressure plate flange and/or the counter pressure plate flange is provided with one or more locking projections pointing towards the solid plate.

Yet another aspect of the present invention relates to an apparatus comprising a solid plate according to the present invention and/or a stuffing box assembly according to the present invention.

Still another aspect of the present invention relates to the use of a solid plate according to the present invention and/or a stuffing box assembly according to the present invention for absorbing axial movements and/or radial movements of a shaft inserted into the stuffing box.

Figure 1:
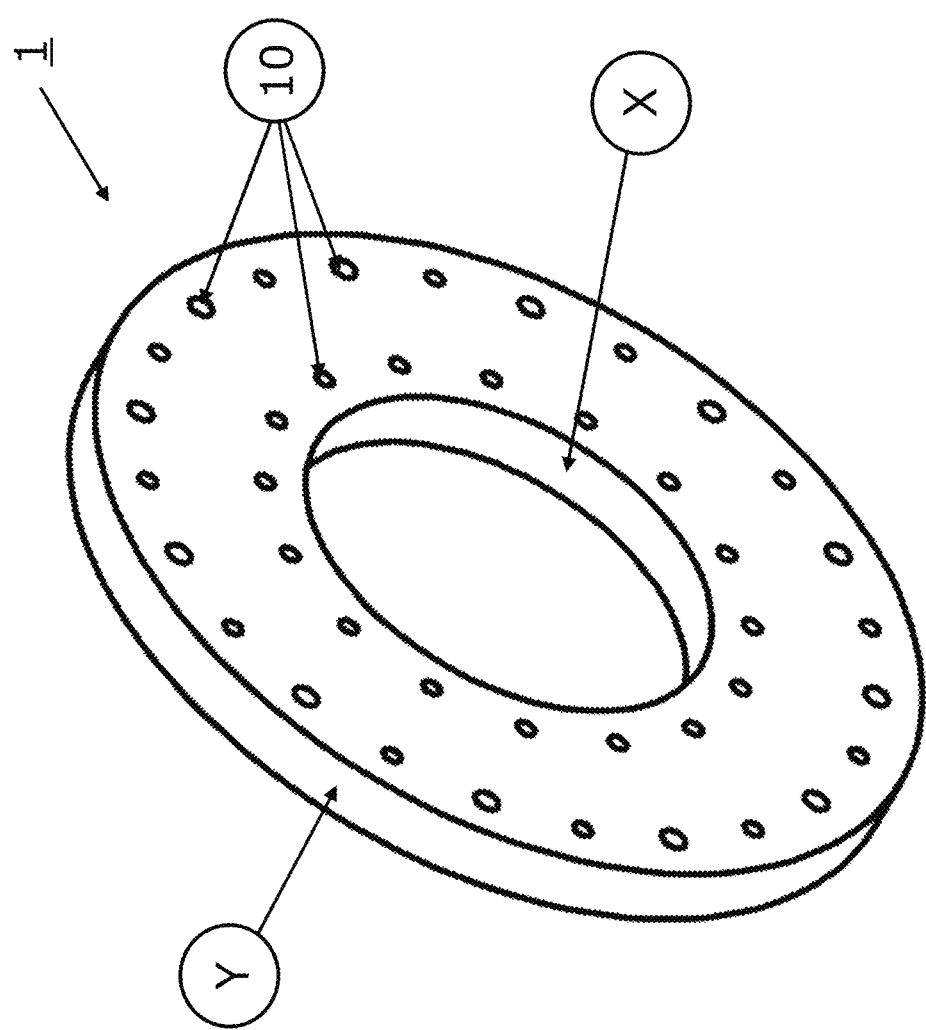
FIG. 1 shows a solid plate (1) according to the present invention.

The present invention will now be described in more detail in the following.

DETAILED DESCRIPTION OF THE INVENTION

Conventional stuffing boxes comprises a packing gland housing comprising a packing material which is adjacent to a pressure plate flange attached at one end of the packing gland housing. At the other end of the packing gland housing a packing gland is introduced which may be fastened adjacent to the other end of the packing gland housing, relative to the pressure plate flange attached. When the stuffing box is to be attached to an apparatus or device, the packing gland housing comprising packing material and the pressure plate flange attached at one end is slid onto a shaft, extending out of the apparatus or device, and towards the apparatus or device to it final position. Then the packing gland may be attached to the packing gland housing and tighten. The tighter the packing gland is made the stronger the effect on the packing material which becomes compressed and creates a seal around the shaft.

Installing conventional stuffing boxes requires very high skills to ensure proper alignment in order to limit or avoid axial and/or radial movements of the shaft in the stuffing box, which leads an uneven sequencing of the packing material which eventually will cause a leakage.

Accordingly, the inventors of the present invention surprisingly found a solid plate suitable for absorbing axial movements and radial movements of a shaft which extends through a stuffing box resulting in a limited or no leakage along the shaft and from the stuffing box.

In the context of the present invention the terms "axial movement" and "radial movement" relates to movements different from the rotating movement of the shaft around the longitudinal centreline of the shaft.

A preferred embodiment of the present invention relates to a solid plate comprising a flexible material, the solid plate comprises a hole provided for receiving a rotating shaft and at least one channel.

In the context of the present invention the term "solid plate" relates to the surface between the circumference of the hole (an inner edge) and an outer edge. Preferably, the solid plate may be ring formed whereby the term "solid plate" may relate to the surface between the inner diameter (X) and the outer diameter (Y).

In an embodiment of the present invention the solid plate may be a disc shaped, or ring formed, solid plate.

In a further embodiment of the present invention the solid plate may comprise an inner diameter (X) and the outer diameter (Y), wherein said inner diameter (X) may be defined by the circumference of the hole for receiving the rotating shaft and wherein the outer diameter (Y) may be defined by the outer edge of the solid plate.

As mentioned above, one reason for providing the solid plate according to the present invention is in order to absorb axial movements and radial movements of a shaft which extends through a stuffing box comprising the solid plate.

In a preferred embodiment of the present invention the solid plate may be prepared from a flexible material.

In an embodiment of the present invention the flexible material may be prepared from an elastomeric material.

The inventors of the present invention surprisingly found that a certain flexibility of the solid plate may be necessary in order to achieve proper and sufficient contact between the solid plate and the stuffing box and between the solid plate and the surface of an apparatus or a device; in order to absorb axial movements and radial movements; and/or in order to provide proper absorption of axial movements and radial movements, without damaging the device or the stuffing box assembly and in order not to loosening attachment means. However, the inventors of the present invention also found that the solid plate should not be too flexible as the flexible element may be easily moved or deformed.

The flexibility of the solid plate according to the present invention is defined by its Shore A value which is traditionally used for measuring the hardness of a material, typically of polymers, elastomers, and rubbers.

In an embodiment of the present invention the solid plate may have a Shore A value in the range of 25-90; such as in the range of 30-80, e.g. in the range of 40-75; such as in the range of 50-70; e.g. in the range of 55-65.

The Shore A value according to the present invention may be determined according to the ISO 868 standard (DIN 53505).

In the context of the present invention the term "Shore A" relates to a measure of the resistance of a material to the penetration of a needle under a defined spring force. The Shore A value according to the present invention may be determined as a number from 0 to 100 on the Shore A scale. The higher the Shore A value the higher the hardness of the material and the more difficult it is for the needle to penetrate the material of the solid plate.

In an embodiment of the present invention the solid plate may have a density in the range of 0.5-3 $g/cm^3$; such as in the range of 0.75-2 $g/cm^3$; e.g. in the range of 1-1.5 $g/cm^3$; such as about 1.15 $g/cm^3$.

In a further embodiment of the present invention the solid plate may have a workable temperature range of −200° C. to +400° C.; such as −100° C. to +300° C.; e.g. −50° C. to 200° C.

In an even further embodiment of the present invention the solid plate may have a tear strength in the range of 1-20 MPa; such as in the range of 2-15 MPa; e.g. in the range of 4-10 MPa; such as about 6 MPa.

In the context of the present invention the term "tear strength" relates to a measure of how well a material can withstand the effects of tearing. In accordance with the present invention the tear strength of the flexible material may be measured as described in the ISO 37 standard (DIN 53504).

In an embodiment of the present invention the solid plate may have an elongation at break in the range of 150-600%; such as in the range of 200-500%; e.g. in the range of 300-400%; such as about 350%.

In the context of the present invention the term "elongation at break" relates to the ratio between increased length and initial length after breakage of the tested specimen at a controlled temperature. It is related to the ability of a plastic specimen to resist changes of shape without cracking. In accordance with the present invention the elongation at break of the solid plate may be measured as described in ISO 37 standard (DIN 53504).

In an embodiment of the present invention the solid plate may have a compression set when measures at 175° C. for 24 hours which is in the range of 10-60%; such as in the range of 20-50%; e.g. in the range of 30-40%; such as about 35%.

In the context of the present invention the term "compression set" relates to the amount of permanent deformation that occurs when a material (the solid plate according to the present invention) is compressed to a specific deformation, for a specified time (24 hours), at a specific temperature (175° C.).

In accordance with the present invention the compression set of the solid plate may be measured as described in ISO 815 standard.

In an embodiment of the present invention the solid plate may be acid resistant, base resistant, ozone resistant and/or weather resistant.

The solid plate may preferably be an electrically insulating material.

In the context of the present invention the term "electrically insulating material" relates to a material whose internal electric charges do not flow freely. In the context of the present invention the term "electrically insulating material" allows no or substantially no, electric current to flow through the material under the influence of an electric field.

A perfect insulating material does not exist because even insulators contain small numbers of mobile charges or charge carriers which can carry current and depending on the voltage applied the electric field tears electrons away from the atoms of the insulating material. The electrically insulating material according to the present invention should be viewed in contrast to other materials, semiconductors and conductors, which conduct electric current easily.

Thus, in the context of the electrically insulating material of the present invention, the statement that "allows substantially no, electric current to flow" relates to the solid plate according to the present invention which may be an example of a material which is preventing significant current from flowing at normally used voltages.

In a preferred embodiment of the present invention the solid plate and/or the flexible material may be a silicone material.

In an embodiment of the present invention the solid plate may be provided in any geometric form with a hole for receiving a rotating shaft, such as a circle; a triangle; or a square; or as an O-ring.

Preferably, the solid plate according to the present invention may be circular, even more preferably, the solid plate according to the present invention may be formed like an O-ring.

The cavity according to the present invention may be an opening in the solid plate going through the solid plate; an opening in the solid plate going into the solid plate; or a combination of an opening in the solid plate going through the solid plate and an opening in the solid plate going into the solid plate.

When the cavity may be an opening going into the solid plate the opening may ends in a dead-end, such as a wall of material like the solid plate.

When the cavity may be an opening into the solid plate, the depth of the opening into the solid plate is smaller than the thickness of the solid plate. In an embodiment of the present invention the depth of the opening into the solid plate is in the range of 50-99% of the thickness of the solid plate; such as in the range of 60-98%; e.g. in the range of 75-97%; such as in the range of 80-95%; e.g. in the range of 85-90%.

In a further embodiment of the present invention the solid plate comprises at least two cavities; such as at least 3 cavities; e.g. at least 4 cavities; such as at least 6 cavities; e.g. at least 8 cavities; such as at least 10 cavities; e.g. at least 12 cavities; such as at least 16 cavities; e.g. at least 20 cavities; such as at least 24 cavities; e.g. at least 28 cavities; such as at least 34 cavities; e.g. at least 40 cavities.

The cavities may be provided in different shapes depending on the purpose and/or application of the cavity. Preferably, the cavities are provided in the same shape whereby production may be easier and a higher flexibility during use may be achieved.

In an embodiment of the present invention the cavities may be provided for receiving a spacer (providing a spacer cavity) and/or for receiving an attachment means (providing an attachment means cavity).

The cavities for receiving the attachment means (providing an attachment means cavity) may be channels toing through the solid plate.

The cavities provided for receiving a spacer (providing a spacer cavity) may be like a channel going through the solid plate and/or the spacer cavity may end in a dead-end. In an embodiment of the present invention some spacer cavities may be channel like going through the solid plate and other spacer cavities may be closed and end in a dead-end.

In the context of the present invention the attachment means relates to means used for attaching the solid plate to a stuffing box and/or a surface or between the stuffing box and the surface, such as the side of a machine/apparatus.

In an embodiment of the present invention the attachment means may be a screw or a bolt.

In yet an embodiment of the present invention the solid plate comprises at least 2 channels for receiving the attachment means; e.g. at least 4 channels for receiving the attachment means; such as at least 6 channels for receiving the attachment means; e.g. at least 8 channels for receiving the attachment means; such as at least 10 channels for receiving the attachment means; e.g. at least 12 channels for receiving the attachment means; such as at least 16 channels for receiving the attachment means; e.g. at least 20 channels for receiving the attachment means; such as at least 24 channels for receiving the attachment means; e.g. at least 28 channels for receiving the attachment means; such as at least 34 channels for receiving the attachment means; e.g. at least 40 channels for receiving the attachment means.

The inventors of the present invention found that when the stuffing box assembly according to the present invention was assembled and the solid plate is fasten, the solid plate may have a tendency to compress and deform resulting in an unstable adsorption of axial movements and radial movement, and the attachment means may loosen because of the axial and radial movements whereby recurring tighten of the attachment means may be necessary. The stuffing box assembly according to the present invention may be maintenance free, since no or minimal reoccurring tighten of attachment means may be necessary and/or no additional lubrication may be necessary.

Hence, in order to stabilize the solid plate at least one cavity may be provided with a spacer. Preferably, the spacer comprises a material different from the solid plate. Preferably, the spacer is not an attachment means.

In an embodiment of the present invention the spacer has a length (in the direction through the solid plate) which is smaller than the thickness of the solid plate. Preferably, the smaller length of the spacer relative to the thickness is determined in the un-compressed state of the flexible element.

The length of the spacer may be in the range of 50-99% of the thickness of the solid plate; such as in the range of 60-98%; e.g. in the range of 75-97%; such as in the range of 80-95%; e.g. in the range of 85-90%.

In an embodiment of the present invention the solid plate comprises at least 2 cavities for receiving the spacer; e.g. at least 4 cavities for receiving the spacer; such as at least 6 cavities for receiving the spacer; e.g. at least 8 cavities for receiving the spacer; such as at least 10 cavities for receiving the spacer; e.g. at least 12 cavities for receiving the spacer; such as at least 16 cavities for receiving the spacer; e.g. at least 20 cavities for receiving the spacer; such as at least 24 cavities for receiving the spacer; e.g. at least 28 cavities for receiving the spacer; such as at least 34 cavities for receiving the spacer; e.g. at least 40 cavities for receiving the spacer.

In a further embodiment of the present invention the solid plate according to the present invention comprises at least 2 channels for receiving the attachment means; e.g. at least 4 channels for receiving the attachment means; such as at least 6 channels for receiving the attachment means; e.g. at least 8 channels for receiving the attachment means; such as at least 10 channels for receiving the attachment means; e.g. at least 12 channels for receiving the attachment means; such as at least 16 channels for receiving the attachment means; e.g. at least 20 channels for receiving the attachment means; such as at least 24 channels for receiving the attachment means; e.g. at least 28 channels for receiving the attachment means; such as at least 34 channels for receiving the attachment means; e.g. at least 40 channels for receiving the attachment means, and at least 2 cavities for receiving the spacer; e.g. at least 4 cavities for receiving the spacer; such as at least 6 cavities for receiving the spacer; e.g. at least 8 cavities for receiving the spacer; such as at least 10 cavities for receiving the spacer; e.g. at least 12 cavities for receiving the spacer; such as at least 16 cavities for receiving the spacer; e.g. at least 20 cavities for receiving the spacer; such as at least 24 cavities for receiving the spacer; e.g. at least 28 cavities for receiving the spacer; such as at least 34 cavities for receiving the spacer; e.g. at least 40 cavities for receiving the spacer.

The two or more cavities (the two or more spacer cavities and/or the two or more attachment means cavities) may preferably be equally spaced apart around the periphery of the solid plate. Preferably, two or more cavities are distributed with the same or substantially with the same distance from a centre point of the hole.

In the context of the present invention the term "substantially" relates to a deviation from the statement by 5% or less; such as by 4% or less; e.g. by 3% or less; such as by 2% or less; e.g. by 1% or less; such as by 0.5% or less; e.g. by 0.1% or less The two or more cavities may be placed in the inner periphery of the solid plate, in the outer periphery of the solid plate or preferably two or more cavities may be placed in both in the inner periphery and in the outer periphery of the solid plate.

In an embodiment of the present invention the spacer may be prepared from a rigid material. Preferably, the rigid material may be inelastic.

The rigid material may be selected from a metal material, a ceramic material or a plastic material.

In an embodiment of the present invention the spacer may be solid, or it may be a tube. Preferably the spacer may be a tube, since a limited amount of material may be used and/or the weight of the flexible element may be reduced.

The solid plate according to the present invention may preferably be adapted for receiving a shaft. This adaptation is provided by the hole provided in the solid plate for receiving the shaft.

The solid plate according to the present invention may have an outer diameter which is larger than the thickness of the solid plate. Preferably, the outer diameter is at least 2 times larger than the thickness of the solid plate; such as at least 5 times larger; e.g. at least 10 times larger; such as at least 15 times larger; e.g. at least 20 times larger; such as at least 30 times larger.

In an embodiment of the present invention the hole may be a substantially centralized hole.

In order to allow rotation of the shaft in the hole the hole may be circularly formed.

In an embodiment of the present invention the circular hole may have a diameter (the inner diameter) which is smaller than a diameter of the solid plate, e.g. the circular solid plate (the outer diameter).

The inner diameter of the solid plate may preferably be aligned with the diameter of the rotating shaft.

In an embodiment of the present invention the inner diameter of the solid plate may be the same as the diameter of the rotating shaft.

In an embodiment of the present invention the inner diameter of the solid plate may be 99% or less of the diameter of the rotating shaft; such as 98% or less; e.g. 97% or less; such as 96% or less; e.g. 95% or less; such as 94% or less; e.g. 93% or less; such as 92% or less; e.g. 91% or less; such as 90% or less; e.g. in the range of 90-100%; such as in the range of 91-99%; e.g. in the range of 92-98%; such as in the range of 93-97%; e.g. in the range of 94-96%; such as in the range of 95-99%; e.g. in the range of 96-99%; such as in the range of 97-98%.

In a further embodiment of the present invention the solid plate may comprise a cut. Preferably, the cut extends from an outer diameter to the inner diameter of the solid plate.

The cut provided in the solid plate of the present invention allows for an easy replacement of the solid plate without the need to exchange the entire stuffing box and the need to disassemble the stuffing box and/or the apparatus or device when changing the solid plate may be limited as the solid plate may be removed and/or inserted by twisting the solid plate around the shaft via the cut.

The solid plate according to the present invention may preferably be used as a solid plate in a stuffing box. The inventors of the present invention found that a unique construction of the stuffing box as defined by the stuffing box assembly defined herein was capable of absorbing axial movements and/or radial movement of a shaft when inserted into the stuffing box assembly.

A preferred embodiment of the present invention relates to a stuffing box assembly comprising a stuffing box and a solid plate according to the present invention, wherein the solid plate may be placed at the end of the stuffing box.

The stuffing box assembly may be defined by having two ends, relative to the longitudinal direction of the shaft, when inserted into the stuffing box. The two ends of the stuffing box assembly may comprise a shaft introducing end and a shaft exit end.

The shaft introducing end may be the end of the stuffing box assembly turning towards the surface from which the shaft extends from, or the end of the stuffing box assembly closest to the surface from which the shaft extends from.

The shaft exit end may be the end of the stuffing box assembly turning away from the surface from which the shaft extends from, or the end of the stuffing box assembly furthest from the surface from which the shaft extends from.

The solid plate according to the present invention may preferably be placed in the shaft introducing end of the stuffing box assembly. Preferably, the solid plate may be placed between the stuffing box and a surface, when the stuffing box assembly is mounted on to the surface.

In an embodiment of the present invention the solid plate may be on a first side (the side of the solid plate turning towards the surface and away from the stuffing box, or the side of the solid plate turning towards the stuffing box and away from the surface) be provided with a pressure plate flange and on a second side (the side of the solid plate turning towards the surface and away from the stuffing box, or the side of the solid plate turning towards the stuffing box and away from the surface—but different from the first side) be provided with a counter pressure plate flange.

In a further embodiment of the present invention the pressure plate flange and/or the counter pressure plate flange may be provided with one or more locking projections pointing towards the solid plate.

Another preferred embodiment of the present invention relates to a stuffing box assembly comprising a stuffing box and a solid plate according to the present invention, the solid plate is placed at the shaft introducing end of the stuffing box, between the stuffing box and a surface, when the stuffing box assembly is mounted on to the surface, the solid plate is on a first side provided with a pressure plate flange and on a second side be provided with a counter pressure plate flange, wherein the pressure plate flange and/or the counter pressure plate flange is provided with one or more locking projections pointing towards the solid plate.

In the context of the present invention the term "locking projecting" relates to a projection provided on the surface of the pressure plate flange and the counter pressure plate flange pointing in the direction of the solid plate. In this way the solid plate becomes fasten and is prevented from undesirable turning or squirming during mounting to the surface or during operation.

In an embodiment of the present invention one of the pressure plate flange or the counter pressure plate flange may be attached to the surface, when the stuffing box assembly is mounted on to the surface, and one of the pressure plate flange or the counter pressure plate flange is attached to the stuffing box.

In the context of the present invention the term "surface" relates to a surface of e.g. an apparatus or a device from which the shaft to be inserted into the stuffing box assembly according to the present invention, extends from.

In an embodiment of the present invention the pressure plate flange and/or the counter pressure plate flange may be provided with several locking projections pointing towards the solid plate. Preferably, both the pressure plate flange and the counter pressure plate flange may be provided with several locking projections pointing towards the solid plate.

Preferably, the pressure plate flange and the counter pressure plate flange may be provided with several locking projections. When several locking projections are provided, the locking projections are preferably distributed over the surface of the pressure plate flange and over the counter pressure plate flange pointing in the direction of the solid plate.

In an embodiment of the present invention the pressure plate flange, the solid plate and the counter pressure plate flange comprising one or more (several) aligned cavities, preferably provided as channels).

In yet an embodiment of the present invention the pressure plate flange, the solid plate and the counter pressure plate flange are assembled by one or more attachment means going through one or more aligned channels.

Preferably the attachment means, may be selected from a screw or a bolt. The attachment means may be entering a pressure plate flange on one side of the solid plate, through a channel of the solid plate, and attached to a counter pressure plate flange on the other side of the solid plate and relative to the pressure plate flange.

The stuffing box assembly according to the present invention may further comprises a holding flange which may be attached to one side of the inner periphery of the solid plate and to the packing gland housing on the other side of the solid plate.

Preferably, the stuffing box assembly according to the present invention comprises a pressure plate flange attached to one side of the outer periphery of the solid plate and a counter pressure plate flange attached to the other side of the outer periphery of the solid plate, and a holding flange attached to one side of the inner periphery of the solid plate and attached to the packing gland housing on the other side of the solid plate.

The surface according to the present invention may relate to the side of a machine/apparatus, preferably the side of a machine/apparatus from which a shaft extends.

In an embodiment of the present invention the stuffing box may comprise one or more packing material surrounding the shaft when inserted into the stuffing box.

The packing material may be a braided packing material.

In an embodiment of the present invention a lining may be provided between the stuffing box assembly according to the present invention and the shaft. Preferably, the lining may be provided between the packing material, such as a braided packing, and the shaft.

In a further embodiment of the present invention the stuffing box assembly may be provided with one or more gasket(s), such as two or more gaskets, e.g. 3 or more gaskets.

The gaskets may be suitable for absorbing and/or transferring stuffing box movements which has not initially been absorbed by the flexible element according to the present invention, back to the solid plate according the present invention, in order to avoid unintentional movements and possible angled and/or uneven squeezing of the packing material inside the stuffing box assembly.

In an embodiment of the present invention the gaskets have a width which is larger than a thickness relative to the centre of the gasket.

In a further embodiment of the present invention the gaskets have a width which is at least 2 times larger than the thickness relative to the centre of the gasket; such as at least 3 times larger; e.g. at least 4 times larger; such as at least 5 times larger.

The stuffing box assembly according to the present invention may preferably be easily constructed allowing easy replacement of individual parts which should be easily changed. This, the stuffing box assembly according to the present invention will be cheap; easy to install, easy to replace individual parts and thus, provides a reduced downtime of the process line using the stuffing box assembly.

In an embodiment of the present invention the flexible element has not been vulcanised on the pressure plate flange or the counter pressure plate flange.

Furthermore, the flexible element has not been vulcanised on to the stuffing box.

In a preferred embodiment of the present invention the solid plate may be a separate and removable unit of the stuffing box assembly.

The solid plate may be removed from the stuffing box assembly by removing the attachment means, removing the pressure plate flange or the counter pressure plate flange and the solid plate may be removed. One advantage of providing the solid plate as a separate and removable unit of the stuffing box assembly may be that the sealing may be replaced without the need to replace other parts of the stuffing box assembly that has not been sufficiently worn.

The solid plate may be provided with a cut as mentioned earlier which may allow easy replacement without the need to exchange the entire stuffing box and without or limited need to disassemble the stuffing box and/or the apparatus or device when changing the solid plate as the solid plate may be removed and/or inserted by twisting the solid plate around the shaft via the cut.

A preferred embodiment of the present invention relates to an apparatus comprising a solid plate according to the present invention and/or a stuffing box assembly according to the present invention.

The apparatus may be a device having a rotating shaft extending through a surface.

Preferably, the apparatus is selected from a device selected from a dryer; a decanter; a drainer; a cooker; hydrolyser; condensers; heat exchangers; a press, such as a continuous presses (wherein the stuffing box assembly constitutes part of devices for the processing of proteins, minerals, ingredients, oils and fuels), e.g. a single screw press or a twin screw press, for pressing liquids from meat, fish, shellfish, larvae and plants; a screw press (wherein the stuffing box assembly constitutes part of devices for the processing of proteins, minerals, ingredients, oils and fuels) for pressing liquids from meat, larvae, fish, shellfish and plants; or other devices for rendering by-products of raw materials based on animals for the processing of proteins, minerals, ingredients, oils and fuels The apparatus according the present invention may be selected from a device used in the production of larvae meal; feather meal; hair meal; hoof meal; nail meal; bone meal; blood meal; or fish meal.

In order to fasten the stuffing box assembly to the apparatus of the present invention a pressure plate flange or a counter pressure plate flange may be attached to the surface of the device.

In an embodiment of the present invention the solid plate may be fastened to the surface of the apparatus or device only separated by one of a pressure plate flange or a counter pressure plate flange. The solid plate may be fastened to the stuffing box only separated by one of a pressure plate flange or a counter pressure plate flange. In a further embodiment of the present invention wherein the solid plate may be fastened to the surface of the apparatus or device only separated by one of a pressure plate flange or a counter pressure plate flange and the solid plate may be fastened to the stuffing box only separated by one of a pressure plate flange or a counter pressure plate flange (different from the flange used between the solid plate and the surface.

The pressure plate flange and/or the counter pressure plate flange may be provided with one or more (preferably multiple) locking protrusions pointing towards the solid plate. The locking protrusions may be protrusions extending from the surface being in contact with the solid plate.

A further preferred embodiment of the present invention relates to the use of a solid plate according to the present invention, or a stuffing box assembly according to the present invention for absorbing axial movements and/or radial movements of a shaft inserted into the stuffing box.

In an embodiment of the present invention at least 25% of the axial movements and/or radial movements of a shaft inserted into the stuffing box may be absorbed, such as at least 50%, e.g. at least 75%; such as at least 85%; e.g. at least 90%; such as at least 95%; e.g. at least 98%.

In an embodiment of the present invention the stuffing box assembly according to the present invention, wherein the stuffing box assembly does not require additional lubrication after the stuffing box assembly has been assembled. Preferably, the stuffing box assembly according to the present invention is a lubrication-free stuffing box assembly. Lubrication-free may relate to a stuffing box assembly where no separate lubricant is added, however, lubricant initially included in the packing material, such as a braided packing material, may be included.

It should be noted that embodiments and features described in the context of one of the aspects of the present invention also apply to the other aspects of the invention.

The invention will now be described in further details in the following detailed description of the figures.

DETAILED DESCRIPTION OF THE FIGURES

FIG. 1 shows a solid plate (1) according to the present invention suitable for absorbing axial and/or radial movements of a shaft (5).

The solid plate (1) is provided with an inner diameter (X) and an outer diameter (Y) as well as a number of cavities (10). The cavities (10) may be formed as an opening in the solid plate (1) going through the solid plate (1) forming channels; as an opening in the solid plate (1) going into the solid plate (1) but not going all the way through the solid plate (1); or a combination of an opening in the solid plate (1) going through the solid plate (1) forming a channel and an opening in the solid plate (1) going into the solid plate (1) but not the entire way through the solid plate (1).

The cavities (10) may allow introduction of a spacer (12a), creating a spacer cavity, or allowing introduction of an attachment means (12b), creating an attachment means cavity, ensuring fastening of the solid plate (1) to a surface (not shown) and/or to a stuffing box (not shown).

Figure 2:
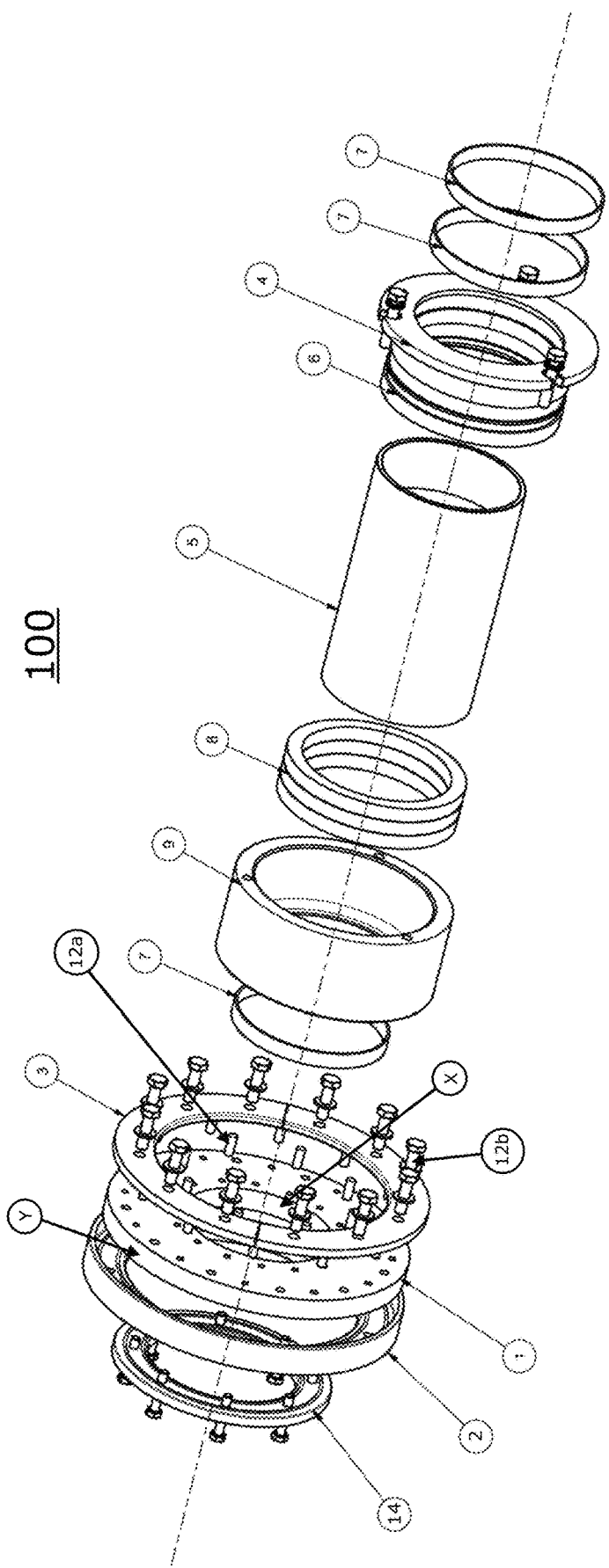
FIG. 2 shows an explosion view of the stuffing box assembly (100) according to the present invention with a shaft (5) inserted into the stuffing box assembly (100)

FIG. 2 shows an explosion view of the stuffing box assembly (100) according to the present invention together with a shaft (5) inserted into the stuffing box assembly (100) and the solid plate (1) is according to the present invention placed at the end of the stuffing box.

FIG. 2 shows the stuffing box assembly (100) according to the present invention comprising a holding flange (14) which may be attached to one side of the inner periphery of the solid plate (1) and to the packing gland housing (9) on the other side of the solid plate (1).

The stuffing box assembly (100) demonstrated in FIG. 2 shows a pressure plate flange (2) attached to one side of the outer periphery of the solid plate (1) and a counter pressure plate flange (3) attached to the other side of the outer periphery of the solid plate (1), and a holding flange (14) attached to one side of the inner periphery of the solid plate (1) and attached to the packing gland housing (9) on the other side of the solid plate (1).

Figure 3:
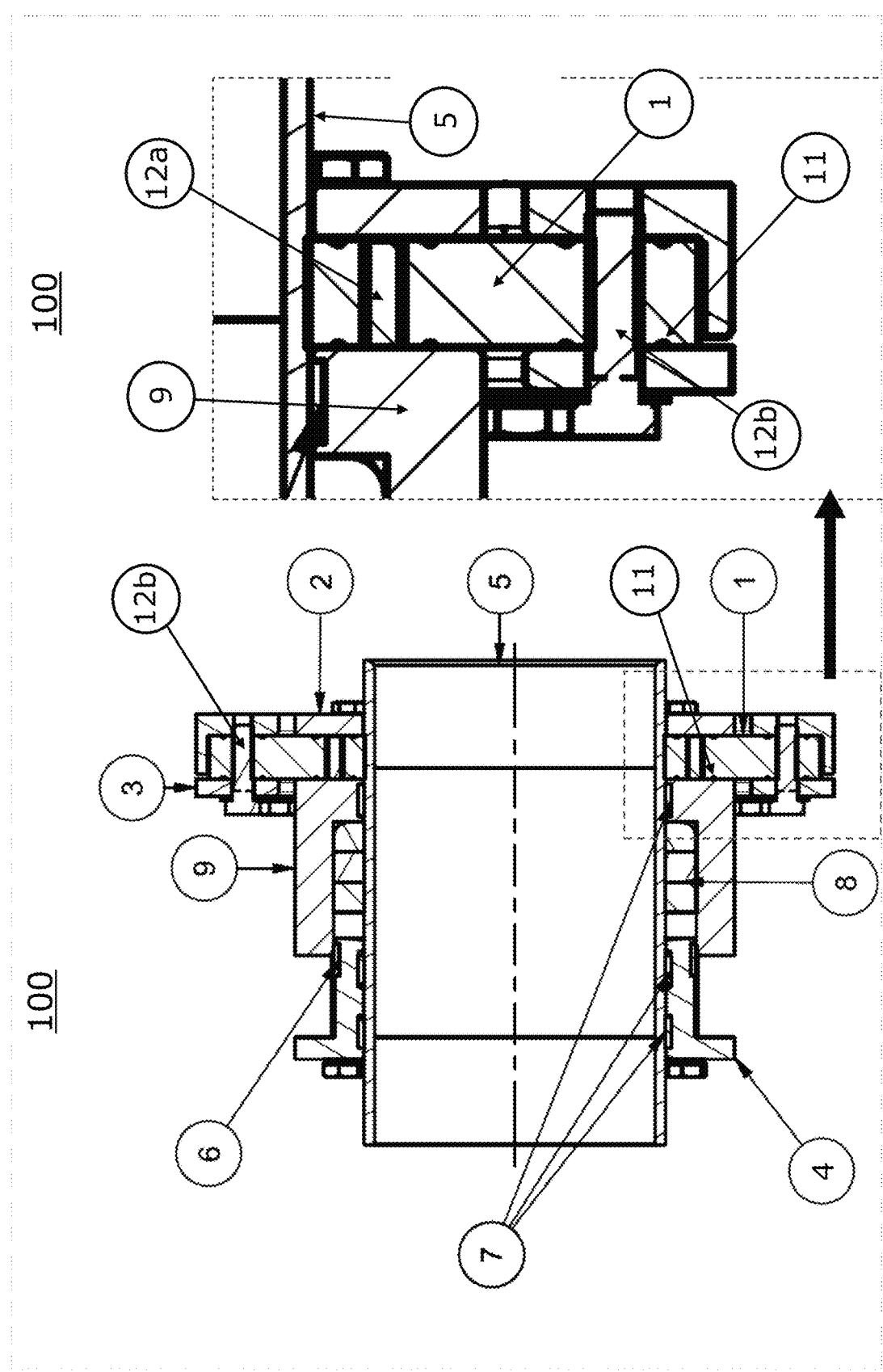
FIG. 3 shows an assembled stuffing box assembly (100) according to the present invention as well as an enlarged image of an essential part of the invention, namely the locking projections (11).

FIG. 3 shows an assembled stuffing box assembly (100) according to the present invention together with a shaft (5) inserted into the stuffing box assembly (100) and the solid plate (1) is according to the present invention placed at the end of the stuffing box. FIG. 3 also comprises an enlarged image of an essential part of the invention, namely the locking protrusions (11).

When the stuffing box assembly of FIGS. 2 and 3 is mounted on an apparatus or a device (not shown) from which a shaft (5) extends from, the end of the stuffing box assembly (100) comprising the projections (1) is turned towards the surface (not shown) of the apparatus or device (not shown) from which the shaft (5) extends from, and the shaft (5) are inserted into the stuffing box assembly (100).

The stuffing box assembly (100) according to the present invention comprises a projections (1) comprising a solid plate (1) and a number of cavities (10) for allowing attachments means (12b) to enter from a pressure plate flange (2) to a counter pressure flange (3), or vice versa. The pressure plate flange (2) and the counter pressure flange (3) enclose the solid plate (1) and in order to reduce the tendency of the solid plate (1) to turn or twist during use, the pressure plate flange (2) and/or the counter pressure plate flange (3) may be provided with one or more (preferably multiple) locking protrusions (11) pointing towards the solid plate (1).

When the attachment means (12b), such as a screw or a bolt, are fastened, the pressure plate flange (2) moves closer to the counter pressure plate flange (3) squeezing the projections (1) and presses the locking protrusions (11) into the solid plate (1) and locks it from turning or twisting during use, but only allows absorbing axial and/or radial movements of the shaft (5).

The solid plate (1) may be provided with one or more spacers (12a) which are suitable for ensuring that the solid plate (1) is not fastened too much between the pressure plate flange (2) and the counter pressure plate flange (3) resulting in deformation of the solid plate (1) causing unnecessary wear and risk of loosening og the attachments means and additional maintenance. An alternative to the use of spacers (12a), aligned attachment means (12b), such as a screw or a bolt, having a specific length aligned with the thickness of the solid plate (1) and the depth of the threaded hole (not shown), may be used. It may be important to fasten the attachment means (12b) very tightly, since no-properly tighten attachment means (12b) may get loose due to axial and/or radial movements of the shaft (5).

Adjacent to the pressure plate flange (2) and the counter pressure plate flange (3) enclosing the solid plate (1), a packing gland housing (9) comprising a packing material (8). At the other end of the packing gland housing (9) a packing gland (4) may be introduced which may be fastened at the other end of the packing gland housing (9), relative to the enclosed solid plate (1). When the stuffing box assembly (100) is to be attached to a surface of an apparatus or a device, the packing gland housing (9) comprising packing material (8) is slid onto a shaft (5), extending out of the apparatus or device, having the end of the stuffing box assembly (100) comprising the solid plate (1) towards the surface of the apparatus or device to it final position. The final position of the stuffing box assembly (100) may preferably be in close contact with the surface from which the shaft (5) extends from.

Preferably, the pressure plate flange (2) or the counter pressure plate flange (3) may be attached to the surface from which the shaft (5) extends from, before the stuffing box assembly according to the present invention is attached.

The stronger the packing gland (8) is tighten, the stronger the effect on the packing material (5) is, and the packing material (5) may become compressed creating a seal around the shaft (5).

The stuffing box assembly (100) may be provided with gaskets (6) between the packing gland housing (9) and the packing gland (4), and/or gaskets (7) between the packing gland housing (9) and/or the packing gland (4) and the shaft (5).

These gaskets (6) and/or (7) may be provided for stabilising rotation of the shaft (5) and/or to absorb axial or radial movements not already absorbed by the solid plate (1).

The invention claimed is:

1. A stuffing box assembly (100) comprising a stuffing box and a solid plate (1) comprising a flexible material, the solid plate comprises a hole provided for receiving a rotating shaft (5) and at least one cavity (10), the solid plate (1) is placed at a rotating shaft (5) introducing end of the stuffing box, between the stuffing box and a surface, when the stuffing box assembly (100) is mounted to the surface, the solid plate (1) is on a first side provided with a pressure plate flange (2) and on a second side provided with a counter pressure plate flange (3), wherein the pressure plate flange (2) and/or counter pressure plate flange (3) is provided with one or more locking projections (11) pointing towards the solid plate (1).

2. The stuffing box assembly (100) according to claim 1, wherein the solid plate (1) is a separate and removable unit of the stuffing box assembly (100).

3. The stuffing box assembly (100) according to claim 1, wherein the at least one cavity (10) is provided for receiving a spacer (12*a*) (a spacer cavity).

4. The stuffing box assembly (100) according to claim 3, wherein the at least one cavity (10) provided for receiving a spacer (12*a*) is a channel going through the solid plate (1) or the spacer cavity and ends in a dead-end.

5. The stuffing box assembly (100) according to claim 1, wherein the solid plate (1) comprises at least one spacer (12*a*).

6. The stuffing box assembly (100) according to claim 5, wherein the spacer (12*a*) has a length (in a direction through the solid plate (1)) which is smaller than a thickness of the solid plate (1).

7. The stuffing box assembly (100) according to claim 5, wherein the at least one spacer (12*a*) is prepared from a rigid material, such as an inelastic rigid material.

8. An apparatus comprising a stuffing box assembly (100) according to claim 1.

9. A method for absorbing axial movements and/or radial movements of a shaft (5) inserted into a stuffing box by providing a stuffing box assembly (100) according to claim 1 into the stuffing box.

10. The stuffing box assembly (100) according to claim 1, wherein the flexible material is an elastomeric material.

11. The stuffing box assembly (100) according to claim 1, wherein the at least one cavity (10) is provided for receiving an attachment means (an attachment means cavity).

12. The stuffing box assembly (100) according to claim 1, wherein the solid plate (1) comprises an inner diameter (X) and the outer diameter (Y), wherein said inner diameter (X) is defined by the circumference of the hold for receiving the rotating shaft (5) and wherein the outer diameter of the (Y) is defining the outer edge of the solid plate (1).

13. The stuffing box assembly (100) according to claim 1, wherein the solid plate (1) comprises a cut, and wherein the cut extends from an outer diameter (Y) to an inner diameter (X) of the solid plate (1).

* * * * *